US007167763B2

(12) United States Patent
Claar et al.

(10) Patent No.: US 7,167,763 B2
(45) Date of Patent: Jan. 23, 2007

(54) METHOD AND APPARATUS FOR PROVIDING A GRAPHICAL USER INTERFACE FOR A PLAYER/RECORDER SYSTEM

(75) Inventors: Jeffrey M. Claar, Aliso Viejo, CA (US); Roger M. Duvall, Garden Grove, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 1020 days.

(21) Appl. No.: 08/936,708

(22) Filed: Sep. 24, 1997

(65) Prior Publication Data

US 2001/0011194 A1 Aug. 2, 2001

(51) Int. Cl.
*G06F 17/00* (2006.01)
*H04B 1/00* (2006.01)
*G11B 27/00* (2006.01)

(52) U.S. Cl. .................. 700/94; 381/119; 715/716; 715/719

(58) Field of Classification Search ............. 700/94; 381/119; 345/354, 326, 347, 716, 771, 773, 345/800, 841, 853, 719, 727–729; 84/609–614, 84/477 R, 478
See application file for complete search history.

(56) References Cited

U.S. PATENT DOCUMENTS

| 4,734,791 | A | | 3/1988 | Stearns et al. | |
|---|---|---|---|---|---|
| 5,206,929 | A | * | 4/1993 | Langford et al. | 395/159 |
| 5,307,456 | A | | 4/1994 | MacKay | 395/154 |
| 5,339,393 | A | | 8/1994 | Duffy et al. | 395/161 |
| 5,371,553 | A | * | 12/1994 | Kawamura et al. | 348/734 |
| 5,467,288 | A | | 11/1995 | Fasciano et al. | |
| 5,487,067 | A | | 1/1996 | Matsushige | |
| 5,517,320 | A | * | 5/1996 | Schuler | 386/46 |

(Continued)

FOREIGN PATENT DOCUMENTS

GB 2 096 868 A 10/1982

(Continued)

OTHER PUBLICATIONS

Schwartz, D.M., Specifications and Implementation of a Computer Augio Console for Digital Mixing and Recording Specifications and Implementations of a Computer Audio console for Gigital Mising and Recording, Oct. 1984, p. 1-14 XP000795030.

(Continued)

*Primary Examiner*—Laura A. Grier
(74) *Attorney, Agent, or Firm*—Blakely, Sokoloff, Taylor & Zafman LLP

(57) ABSTRACT

In a player/recorder system, a graphical user interface method allows central control of one or more tracks of a plurality of audio processing modules. The plurality of audio processing modules are connected to a computer system having a processor and a display. The method includes the steps of generating a first display portion on the display by the processor, the first display portion including one or more control boxes to control a corresponding one or more tracks of the plurality of audio processing modules and generating a second display portion on the display by the processor, the second display including a central control mechanism for controlling all of the one or more tracks of the audio processing modules.

17 Claims, 5 Drawing Sheets

U.S. PATENT DOCUMENTS

| | | | | |
|---|---|---|---|---|
| 5,588,105 A | * | 12/1996 | Foster et al. | 395/326 |
| 5,657,246 A | | 8/1997 | Hogan et al. | 348/515 |
| 5,664,146 A | | 9/1997 | Bolin et al. | 711/115 |
| 5,668,966 A | | 9/1997 | Ono et al. | 345/356 |
| 5,862,231 A | * | 1/1999 | Tokuhisa | 381/61 |
| 5,887,067 A | * | 3/1999 | Costa et al. | 381/81 |
| 5,901,313 A | * | 5/1999 | Wolf et al. | 345/335 |
| 6,061,458 A | * | 5/2000 | East et al. | 381/119 |
| 6,160,213 A | * | 12/2000 | Arnold et al. | 84/615 |
| 6,166,731 A | * | 12/2000 | Duvall et al. | 715/723 |
| 6,182,106 B1 | * | 1/2001 | Casey et al. | 709/100 |
| 6,441,830 B1 | * | 8/2002 | Duvall et al. | 715/716 |

FOREIGN PATENT DOCUMENTS

| | | |
|---|---|---|
| GB | 2 302 742 A | 1/1997 |
| GB | 2 323 738 A | 9/1998 |
| WO | WO 88/02958 | 4/1988 |

OTHER PUBLICATIONS

Borish, J. et al., "Sounddroid: A New Approach to Digital Editing and Mixing of Sound", British Kinernatography Sound and Television Society Journal, British Kinematograph Sound and Television Society, London, GB, vol. 67, No. 11, Nov. 1985, pp. 616-621, XP000794994.

* cited by examiner

FIG. 5

METHOD AND APPARATUS FOR PROVIDING A GRAPHICAL USER INTERFACE FOR A PLAYER/RECORDER SYSTEM

BACKGROUND OF THE INVENTION

1. Field of the Invention

The present invention relates generally to graphical user interfaces, and specifically, to a method and apparatus for providing a graphical user interface to centrally and/or simultaneously control one or more tracks of one or more audio processing modules in a player/recorder system.

2. Background Information

A typical film player/recorder system includes a plurality of audio modules for providing audio tracks required to play and/or record the numerous audio sounds that are in a film. Each audio module supports up to a limited number of tracks so that typically more than one audio module is needed. Moreover, each audio module includes a front panel which has various control buttons such as play, record, mute, volume control, etc., for each track. However, the problem with the audio modules is that if a command (e.g., record) is to be issued to a particular track of a particular audio module, a user must physically move to that particular module to perform the command. This may be undesirable when there are a number of such modules, especially when they are dispersed.

Accordingly, it is desirable to have a method and apparatus for a graphical user interface to centrally and/or simultaneously control one or more tracks of one or more audio modules.

SUMMARY OF THE INVENTION

Graphical user interface methods are described. In a player/recorder system, a graphical user interface method allows central control of one or more tracks of a plurality of audio processing modules. The plurality of audio processing modules are connected to a computer system having a processor and a display. The method includes the steps of generating a first display portion on the display by the processor, the first display portion including one or more control boxes to control a corresponding one or more tracks of the plurality of audio processing modules and generating a second display portion on the display by the processor, the second display including a central control mechanism for controlling all of the one or more tracks of the audio processing modules.

BRIEF DESCRIPTION OF THE DRAWINGS

The features and advantages of the present invention will become apparent from the following detailed description of the present invention in which:

FIG. 5 illustrates an alternative exemplary embodiment of a graphical user interface of the present invention.

DESCRIPTION OF THE PREFERRED EMBODIMENT

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
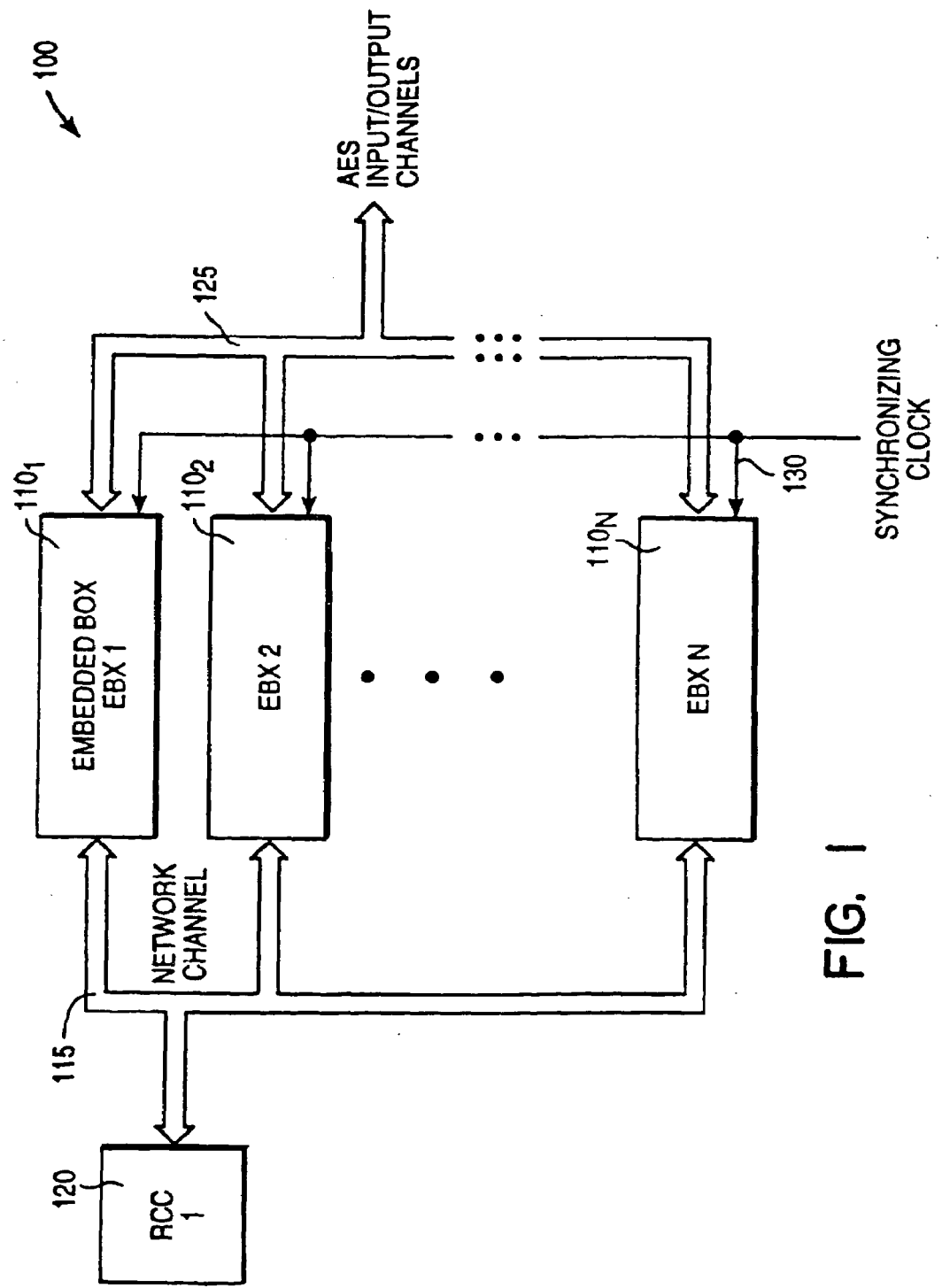
FIG. 1 is a block diagram illustrating an exemplary system for implementing the present invention.

FIG. 1 is a block diagram illustrating an exemplary system 100 for implementing the present invention. Referring to FIG. 1, the system 100 is an audio player/recorder system and comprises a plurality of embedded boxes ("EBXs") $110_1$–$110_N$ ("N" being a whole positive number), a remote client computer ("RCC") 120, a network channel 115, audio electronic standard ("AES") input/output channels 125, and a synchronizing clock 130.

Each of the EBXs $110_1$–$110_N$ is an audio signal processing system with mass storage. In particular, each EBX includes a personal computer ("PC") system and one or more digital signal processors ("DSPs"). Audio sampled data are stored in multiple dynamic random access memory ("DRAM") banks. These DRAM banks are accessible to both the host processor of the PC and the DSPs. Each EBX can control up to X AES I/O channels, where X is a positive whole number greater than zero. In one embodiment, each EBX controls sixteen AES I/O channels. The synchronizing clock 130 provides a master timing signal to synchronize all real-time activities of EBXs $110_1$–$110_N$. The details of the EBX architecture will be discussed later.

The RCC 120 provides a graphical user interface ("GUI") for transmitting centralized commands (also referred to as control information) to one or more of the plurality of EBXs $110_1$–$110_N$ over the network channel 115. The RCC 120 has two modes of communication to the EBXs, namely, individual addressing and broadcasting. In individual addressing, the RCC 120 issues a command to a specified EBX (or a specified I/O channel of the specified EBX). The individual address of the destination is encoded as part of the command. In broadcasting, a command is issued to all the EBXs connected to the system 100. This allows centralized and simultaneous control of all I/O channels (also referred to as tracks) of the EBXs. In one embodiment, the RCC is a computer system (e.g., desktop, laptop, palmtop, etc.) that has, among other things, memory for storing the GUI, a processor for executing the GUI, a display for displaying the GUI, and input/output means for transmitting and/or receiving commands over the network channel 115.

Figure 2:
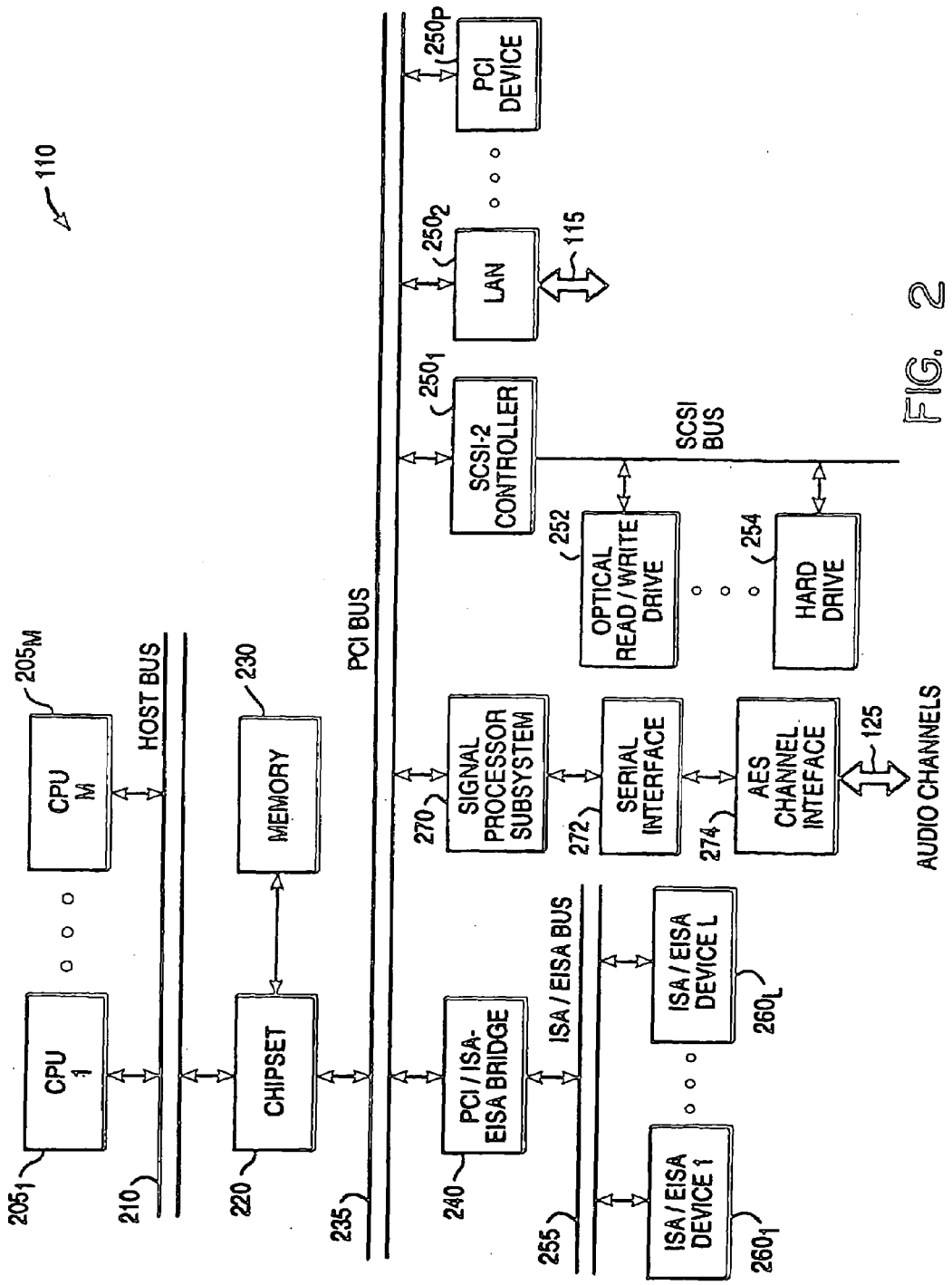
FIG. 2 is a block diagram illustrating one embodiment of an EBX of the present invention.

FIG. 2 is a block diagram illustrating one embodiment of an EBX 110 of the present invention. Referring to FIG. 2, the EBX 110 comprises one or more processors $205_1$–$205_M$ ("M" being a positive whole number) and a main memory element 230 (e.g., dynamic random access memory "DRAM", static random access memory "SRAM", etc.) coupled together by a chipset 220. The chipset 220 is coupled to a host bus 210 and operates as an interface between the host bus 210 and a peripheral bus 235.

Processors $205_1$–$205_M$ may be any type of microprocessors. In one embodiment, processors $205_1$–$205_M$ are the Pentium® or Pentium Pro® microprocessors manufactured by Intel Corporation of Santa Clara, Calif. Chipset 220 typically includes a cache DRAM controller ("CDC"), a peripheral bus controller, and a data path unit ("DPU"). In one embodiment, chipset 220 further includes a Peripheral Component Interconnect ("PCI") bus Bridge that provides a set of host-to-PCI and PCI-to-host bus translations.

The host bus 210 is a bus that can support transactions to a number of connected processors. Host bus 210 may be referred to as a parallel bus or multiprocessor bus because it supports parallel operations and multiple processors. It is contemplated that host bus 210 operates in a pipelined manner to increase efficiency. However, these features should not be construed to limit the teachings of the present invention. The present invention can be utilized if there is only one processor connected to the host bus 210.

The peripheral bus 235 provides a communication path between the processors $205_1$–$205_M$ or main memory element 230 and a plurality of peripheral devices $250_1$–$250_P$ ("P" being a positive whole number). Peripheral device $250_1$ is a small computer system interface ("SCSI") controller that provides an interface to an optical read/write drive 252, a hard drive 254, etc. The hard drive 254 may contain audio sounds to be played on one or more of the I/O channels 125 or may store audio sounds coming in on one or more of the I/O channels. In addition, peripheral device $250_2$ is a network interface card for interfacing with the network channel 115 of FIG. 1. Other peripheral devices may include I/O devices such as a data entry interface circuit, a pointing device controller, and a graphics controller. The peripheral bus 235 may be a PCI bus or any other type of bus architecture.

EBX 110 further comprises a signal processing subsystem ("SPS") 270 which includes one or more digital signal processors ("DSPs"), multiple DRAM banks, and a PCI bus interface circuits. The SPS 270 interfaces to a serial input/output communication device 272 which is connected to an AES I/O channel interface 274. The SPS 270 performs dedicated signal processing tasks including accessing audio data from multiple memory banks, digital filtering of the audio data, and interfacing to other subsystems. The SPS 270 further includes an efficient memory access switching mechanism.

A peripheral/expansion bus bridge 240 provides a communication path between the peripheral bus 235 and a plurality of expansion peripheral devices $260_1$–$260_K$ ("K" being a positive whole number) on an expansion bus 255. The expansion bus 255 may include an Industry Standard Architecture ("ISA") bus or an Extended Industry Standard Architecture ("EISA") bus. However, it is apparent to one skilled in the art that the specific architecture of the EBX 110 is not critical in practicing the present invention.

Figure 3:
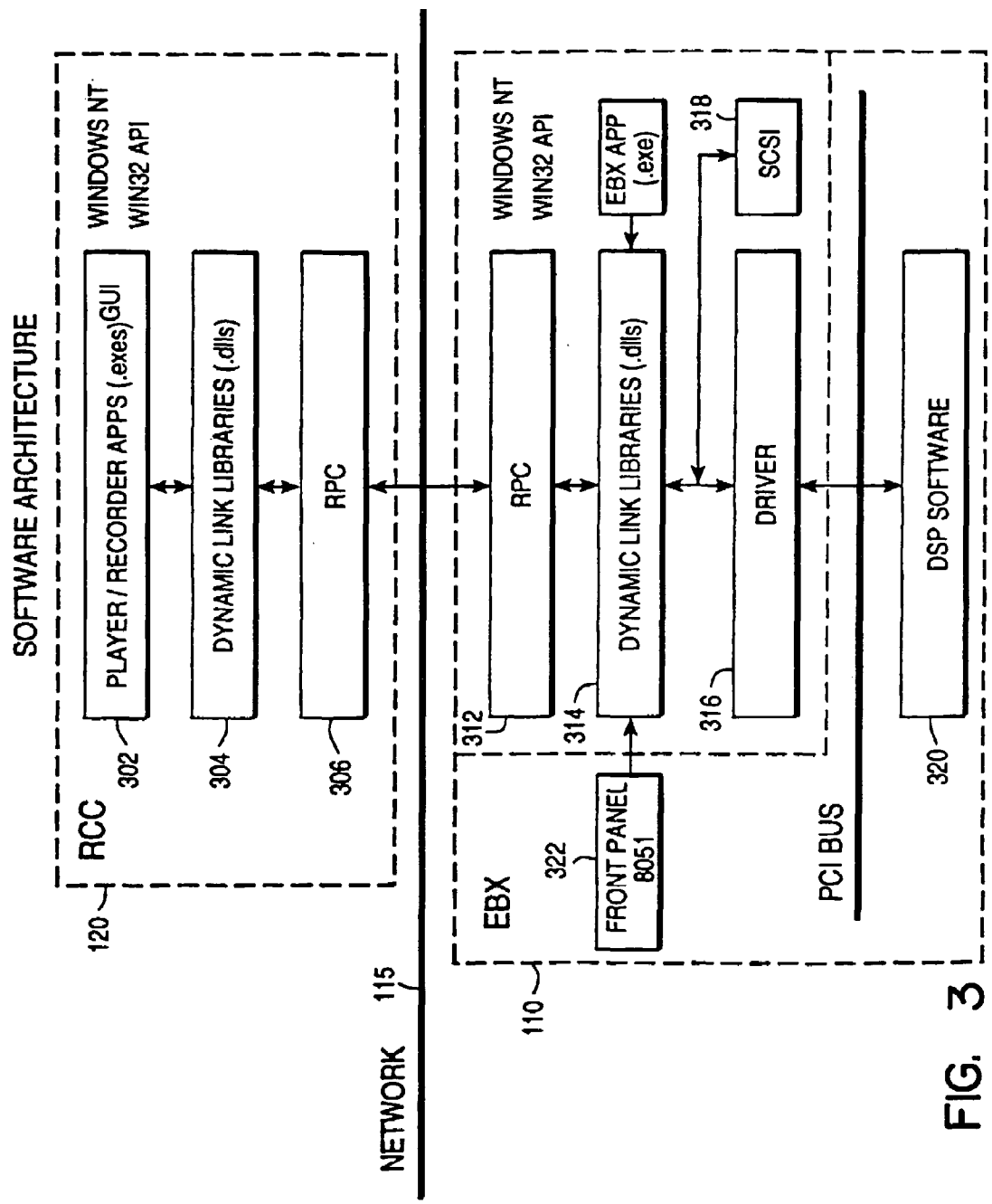
FIG. 3 is a block diagram illustrating an exemplary software architecture of the present invention.

FIG. 3 is a block diagram illustrating an exemplary software architecture of the present invention. RCC 120 is coupled to one or more EBXs $110_1$–$110_N$ through network channel 115. RCC 120 may run on various platforms such as Windows NT, Windows 95, Macintosh, etc. Referring to FIG. 3, RCC 120 has a plurality of player/recorder applications 302 (e.g., GUI of FIG. 4) coupled to a dynamic link library ("DLL") 304. A DLL is a file containing executable code and data which is bound to a program at load time or run time rather than during linking. It is to be noted that the code and data in the DLL 304 can be shared by the plurality of player/recorder applications simultaneously (assuming that the applications are running on the same CPU). The RCC 120 uses a remote procedure call ("RPC") 306 mechanism for transferring commands between the RCC 120 and one or more of the EBXs $110_1$–$110_N$ by way of network channel 115. Commands may be directed to a specific EBX or may be broadcast to all EBXs.

Each EBX includes an RPC module 312, a DLL 314, a device driver 316, and a SCSI driver 318. The device driver 316 acts as an interface between the DLL 314 and a DSP software 320 via a bus (e.g., PCI bus 235 of FIG. 2). The DLL 314 and the SCSI driver 318 are controlled by the host processor (i.e., processor 205 of FIG. 2). The DLL 314 receives remote commands from the RCC 120 (e.g., such as a global play command, a record command for a specific track, etc.), processes the commands, and forwards them to the DSP software 320 via device driver 316 for execution.

Figure 4:
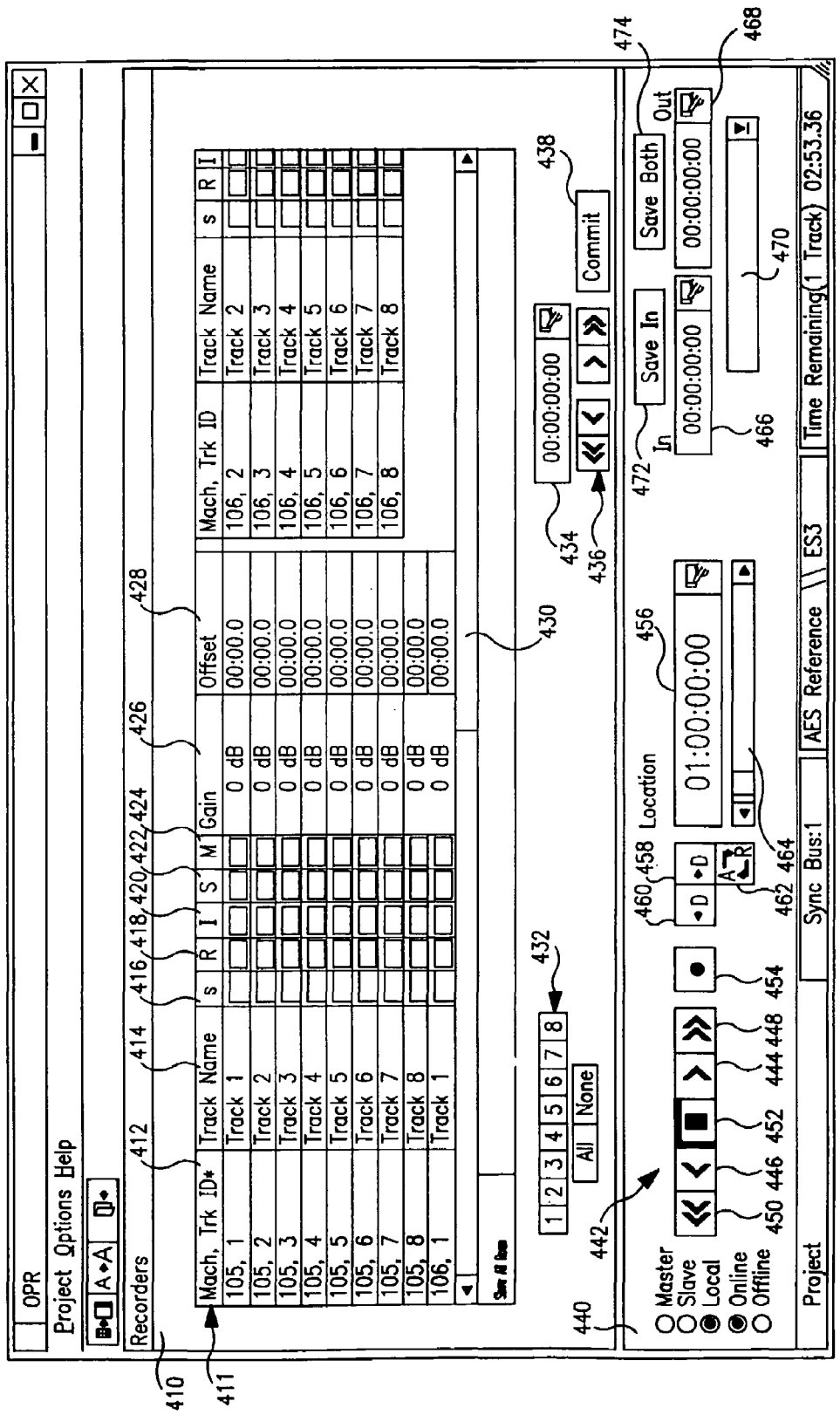
FIG. 4 illustrates an exemplary embodiment of a graphical user interface of the present invention.

FIG. 4 illustrates an exemplary embodiment of a graphical user interface 400 of the present invention. Referring to FIG. 4, the GUI 400 comprises a first display portion 410 and a second display portion 440. The first display portion 410 includes one or more control boxes 411 corresponding to the AES I/O channels (i.e., tracks) of the one or more EBXs $110_1$–$110_N$ that are connected to (or loaded in) the system. Each control box 411 includes (i) a machine ID box 412 which specifics the track (i.e., I/O channel) of the EBX that is under control; (ii) a track name box 414 which specifies the name of the track that is under control (e.g., dialog track); (iii) "sRISM" buttons 416, 418, 420, 422, and 422 which correspond to "safety", "Record", "Input Monitor", "Solo", and "Mute" buttons, respectively, for the track under control; (iv) a gain box 426 to control the volume of the track; and (v) an offset box 428 to offset a track with respect to time. By selecting or "clicking" one or more of the "sRISM" buttons, varying the gain, or changing the offset of a track of an EBX, the command selected is transferred over the network channel to the EBX to perform the command selected on the track. During playing of all loaded tracks in the system, if the "Solo" button 422 for one or more tracks is selected or "clicked", all other loaded tracks in the system are muted except for the one or more tracks that have the "Solo" button selected or "clicked".

The first display portion 410 includes a scroll bar 430 to horizontally scroll (or vertically scroll) the first display portion 410. The scroll bar 430 provides access to the control boxes 411 of the numerous tracks (e.g., 300 or more) that may be loaded in the system and that may not all fit on the screen at the same time. The first display portion 410 further includes one or more selection buttons 432 (eight buttons are shown in FIG. 4). This feature allows the function of one or more tracks to be assigned to a selection button and when selected, the function of the one or more tracks is performed. For example, a selection button 430 may be assigned to "mute" certain tracks after the tracks start playing. An offset time box 434 is provided which displays the offset time of the track selected. An adjustment mechanism 436 allows various adjustments to be made to the offset time of the selected track. A commit button 438 allows the offset time to be reset to zero.

The present invention includes a mechanism which provides control of all tracks (e.g., 16) of an EBX with a single control box 411. That is, all control boxes corresponding to all tracks of an EBX may be collapsed into a single control box 411 by selecting a menu item from the GUI 400. The single control box will then control all tracks of the EBX selected. Thus, if a record button is selected, all the tracks for that particular EBX will start recording. This mechanism is useful in situations where all tracks of an EBX are controlled in the same manner.

The second display portion 440 comprises a centralized control mechanism 442 which includes a forward play button 444 and a reverse play button 446, a fast forward play button 448 and a fast reverse play button 450, a stop button 452, and a record button 454. Centralized control mechanism 442 allow centralized and simultaneous control of all currently loaded tracks. The second display portion 440 further includes time box 456 which displays the current time of all the tracks, a reset button 458 for resetting the current time to zero, a restore button 460 for restoring the current time (before it was reset), a toggle box 462 for toggling between the two times, and a time scroll bar 464 for providing quick adjustment of the current time. The time box 456 conforms to a number of time formats such as, but not limited or restricted to, a Society of Motion Picture and Television Engineers ("SMPTE"), a Musical Instrument Digital Interface ("MIDI"), or a footage frame time format. The time in the time box 456 is typically synchronized to an external time source (e.g., a video deck, projector, etc.).

In addition, the second display portion 440 includes a save in time box 466, a save out time box 468, a pull down menu 470 of saved times, a save in button 472, and a save both button 474. The save in and save out time boxes 466 and 468 allow a user to enter (for saving) the start and stop times (i.e., a range of time) and to save the start and stop times in the pull down menu 470 for later retrieval. The start time is saved by selecting or "clicking" the save in button 472 and both the start and stop times are saved by selecting or "clicking" the save both button 474. The user can then retrieve the range of time saved and perform one or more operations during the range of time such as recording on a particular track.

Figure 5:
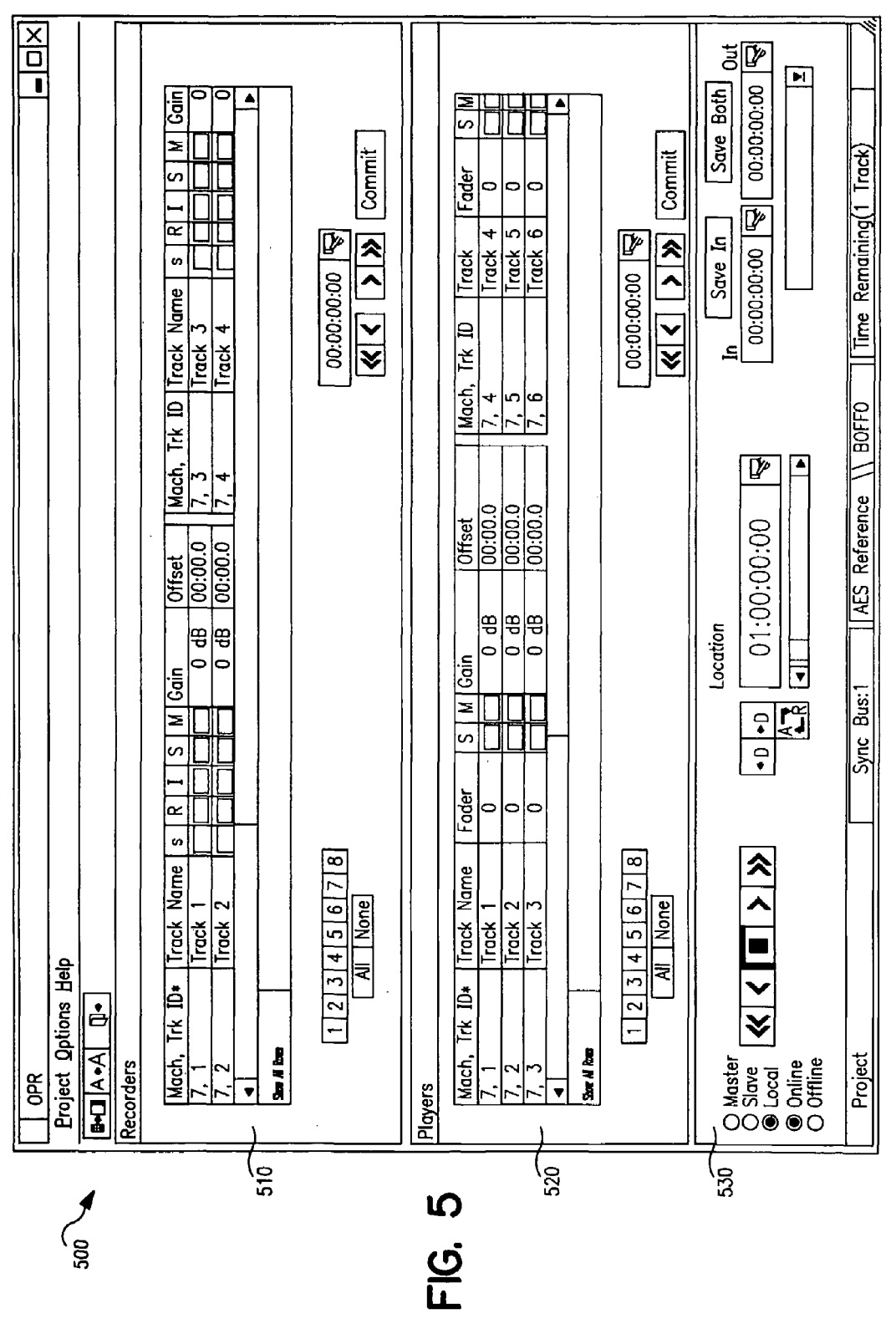

FIG. 5 illustrates an alternative exemplary embodiment of a graphical user interface 500 of the present invention. Referring to FIG. 5, the GUI 500 includes a first display portion 510, a second display portion 520, and a third display portion 530. The first display portion 510 displays and controls all recorder tracks that are loaded, the second display portion 520 displays and controls all player tracks that are loaded, and the third display portion 530 is the central control of all the loaded tracks. The difference between a recorder track and a player track is that a record operation cannot be performed on a player track. Grouping the recorder and player tracks on separate display portions provides a simple way to distinguish one track type from another.

Referring back to FIGS. 1–4, when the play button 444 is selected, the GUI 400 (i.e., a player/recorder application 302 of FIG. 3) transmits (broadcast) a play command by way of the RPC 306 to all loaded EBXs over the network channel 115. Each EBX receives the play command by its RPC 312 and forwards the command to the DSP software 320 by way of interface device driver 316. The DSP software 320 receives the play command and causes the SPS 270 to play all the tracks. The processor 205 controls the SCSI card $250_1$ by directing it to load data to and from the memory on the DSP of the SPS 270. In addition, if the front panel 322 includes light emitting diodes ("LEDs") for play, then the LED is turned on by code in a DLL on the EBX. It must be noted that when, for example, a record button (of a track) on a front panel 322 is manually depressed, the GUI 400 is also updated to reflect that the track is recording.

With the GUI of the present invention, centralized and/or simultaneous control of all tracks of the EBXs is achieved. That is, each track may be individually controlled by way of the first display portion 410 of the GUI 400 or all tracks may be simultaneously controlled by way of the second display portion 440 of the GUI 400.

Although the present invention has been described in terms of a preferred embodiment, it will be appreciated that various modifications might be made by those skilled in the art without departing from the spirit and scope of the present invention.

What is claimed is:

1. A graphical user interface (GUI) of a player/recorder system comprising:
   a first display portion including a plurality of control boxes each corresponding to one or more of a plurality of player tracks associated with at least one audio processing module;
   a second display portion displayed concurrently with the first display portion, the first display portion further comprising a scroll bar that provides access to the plurality of control boxes that are loaded into the player/recorder system but are not visible on a screen displaying the GUI; the second display portion including a central control mechanism for substantially simultaneously controlling all of the plurality of tracks of the at least one audio processing module; and
   a third display portion displayed concurrently with the first display portion and the second display portion to produce the GUI, the third display portion including a plurality of recorder control boxes each adapted to control one or more of a plurality of recorder tracks associated with the at least one audio processing module.

2. The GUI of claim 1, wherein each of the plurality of control boxes including at least one selection button that, when selected, performs a predetermined function on two or more of the plurality of tracks concurrently.

3. The GUI of claim 2, wherein the selection button mutes at least two player tracks of the plurality of player tracks after the plurality of player tracks start playing.

4. The GUI of claim 1, wherein the third display portion comprises a record button for each specific track of the plurality of recorder tracks and wherein the record button is selectable to transmit a record command to an audio processing module having the specific track to cause the specific track to record an audio sound.

5. The GUI of claim 1, wherein the central control mechanism is selectable to transmit a global control command associated with the central control mechanism to the at least one audio processing module to perform a function assigned to the global control command.

6. The GUI of claim 1, wherein the second display portion includes a global stop button to control the tracks of the at least one audio processing module.

7. In a player/recorder system having a plurality of audio processing modules each having one or more tracks and each connected to a computer system having a processor and a display, a graphical user interface method of centrally controlling each of the one or more tracks of the plurality of audio processing modules, the method comprising:
   generating a first display portion on the display by the processor, the first display portion including a plurality of player control boxes each adapted to control at least one player track of an audio processing module of the plurality of audio processing modules;
   generating a second display portion on the display by the processor, the second display portion including a central control mechanism for simultaneously controlling all of the plurality of tracks of each of the plurality of audio processing modules; the first display portion further comprising a scroll bar that provides access to the plurality of control boxes that are loaded into the player/recorder system but are not visible on a screen displaying the GUI and
   generating a third display portion on the display concurrently with the first display portion and the second display portion, the third display portion including a plurality of recorder control boxes each adapted to control at least one recorder track of an audio processing module of the plurality of audio processing modules.

8. The method of claim 7, further comprising:
selecting one of the player control boxes corresponding to one of the plurality of player tracks;
transmitting a control command associated with the one of the player control boxes from the computer system to a determined audio processing module having the one of the tracks; and
performing a function assigned to the control command at the determined audio processing module.

9. The method of claim 8:
wherein each audio processing modules has one or more input/output ("I/O") channels each connected to the computer system;
wherein the control boxes control a corresponding one or more I/O channels of the plurality of audio processing modules;
wherein transmitting the control command comprises transmitting the control command from the computer system to the audio processing module having the I/O channel corresponding to the specified control box; and
wherein performing a function comprises performing a task assigned to the control command by the audio processing module with respect to the I/O channel.

10. The method of claim 7, further comprising:
selecting a record button of a specific recorder track of the at least one recorder tracks;
transmitting a record command from the computer system to an audio processing module having the specific recorder track; and
causing the specific recorder track to record an audio sound by the audio processing module.

11. The method of claim 7, further comprising:
selecting the central control mechanism;
transmitting a global control command associated with the central control mechanism from the computer system to the plurality of audio processing modules; and
each audio processing module, performing a function assigned to the global control command by the audio processing module.

12. The method of claim 11:
wherein each audio processing module has one or more input/output ("I/O") channels each connected to the computer system;
wherein the central control mechanism controls all of the one or more I/O channels of the plurality of audio processing modules;
wherein transmitting the global command comprises global control command associated with the central control mechanism from the computer system to the plurality of audio processing modules; and
wherein performing a function comprises performing a task assigned to the global command by each audio processing module with respect to all of the I/O channels.

13. The method of claim 7, wherein the central control mechanism comprises a global play command for simultaneously controlling all of the loaded player tracks of the plurality of tracks of the audio processing modules and wherein the method further comprises:

selecting the global play command;
transmitting the global play command from the computer system to the plurality of audio processing modules; and
each audio processing module, causing all the loaded player tracks to each play an audio sound.

14. The method of claim 7, wherein the central control mechanism comprises a global stop command for simultaneously controlling all of the loaded tracks of the plurality of audio tracks of the audio processing modules and wherein the method further comprises:
selecting the global stop command;
transmitting the global stop command from the computer system to the plurality of audio processing modules; and
each audio processing module, causing all the loaded tracks to each stop any play or record activity.

15. A machine-readable medium having stored thereon data representing instructions which, when executed by a machine, cause the machine to perform operations comprising:
generating a first display portion on a display of a player/recorder system, the first display portion including a plurality of control boxes to control a corresponding one or more of a plurality of player tracks of each of a plurality of audio processing modules, the first display portion further comprising a scroll bar that provides access to the plurality of control boxes that are loaded into the player/recorder system but are not visible on a screen displaying the GUI;
generating a second display portion on the display, the second display portion including a central control mechanism for simultaneously controlling all of the plurality of tracks of each of the plurality of audio processing modules; and
generating a third display portion displayed concurrently with the first display portion on the display, the third display portion including a plurality of recorder control boxes each to control a corresponding one or more of a plurality of recorder tracks of each of the plurality of audio processing modules.

16. The medium of claim 15, wherein the instructions further comprise instructions which, when executed by the machine, cause the machine to perform further operations comprising:
receiving a selection of one of the control boxes corresponding to one of the tracks; and
transmitting a control command associated with the one of the control boxes to an audio processing module having the one of the tracks.

17. The medium of claim 15, wherein the instructions further comprise instructions which, when executed by the machine, cause the machine to perform further operations comprising:
receiving a selection of the central control mechanism; and
transmitting a global control command associated with the central control mechanism to the plurality of audio processing modules.

* * * * *